Feb. 2, 1971  P. A. KANE  3,559,304
APPARATUS FOR TEACHING
Filed June 5, 1968

Patrick A. Kane
INVENTOR.
BY Norman H. Huff 3,559,304
APPARATUS FOR TEACHING
Patrick A. Kane, Hartline, Wash. 99135
Filed June 5, 1968, Ser. No. 734,797
Int. Cl. G09b 5/02
U.S. Cl. 35—48                                          4 Claims

ABSTRACT OF THE DISCLOSURE

An inexpensive throw-away answer sheet of opaque material adapted to be dispersed or punctured easily by a hand-held conductive stylus and having an electrical conductor on the back of the sheet effective to be electrically connected to said stylus upon the passage of said stylus through said sheet; and the method of using same to conserve more expensive educational forms.

---

My present invention is broadly an apparatus for facilitating teaching techniques by utilizing electrically implemented teaching devices, and is a further improvement corresponding to parts of my copending applications as follows:

Ser. No. 607,802, filed Jan. 1, 1967, for Electrokinetic Tutoring Means; Ser. No. 618,484, filed Feb. 24, 1967, for Method and Means for Self Teaching.

There are a number of organizations which produce educational materials in the form of workbooks. These may be provided in the form of printed drills and tests with selective multiple-choice answers which are to be marked by the student. The used page, with questions and marked answers, is corrected, in most cases, by placing a template over the answer portion and thereby quickly determining the grade in the customary manner by calculating the percentage of correct answers.

While this method is an improvement over the older prevailing custom of reading written answers, it has the disadvantage of being relatively expensive and wasteful, since the printed pages, once used, are of no further value except as records. It also is of limited value as a teaching method because the student is not informed of his misconceptions until the papers are corrected and returned, by which time he is little concerned with the subject's matter of the test, but only in the grade.

For the foregoing reasons, educators are more and more turning to apparatus and methods which will instantaneously inform a student whether his answer is correct or incorrect, thus serving the dual purpose of testing the student's present knowledge and simultaneously teaching him the correct answer while the subjects matter are in mind.

My present invention is directed toward accomplishing these teaching and testing functions, but enabling the teacher to utilize the conventionally produced workbooks of which there is ample quantity, but minimize the cost thereof by facilitating their successive use by many students. They are also adapted for electronically indicating immediate results to enhance their value as teaching aids.

It is therefore one object of the present invention to provide a component for an electrically implemented educational device which will afford the foregoing desirable functions with respect to conventional, non-electrical, workbooks of the class described.

A further object of the present invention lies in the provision of a method for conserving said workbooks for use by successive students by providing a disposable answer sheet for each test page of said workbooks and which has selected indicia thereon in the same relative position as the said workbooks' pages, for receiving the students answers selecting mark.

Yet another object of my invention is to provide a component for an electrically implemented educational device which is sufficiently inexpensive to be disposable, yet capable of serving to supply, instantaneously to the student, information as to the accuracy of his selected answers.

The foregoing and additional objects and advantages will become apparent during the course of the following specification which refers to the accompanying drawings by the utilization of reference numerals. It should be understood that the drawings and this specification are intended to exemplify the invention and in no way are they to be construed as being an exhaustive treatise of the subject or physical modifications possible with respect thereto. The appended claims set out the scope of the invention sought and are to be construed as broadly as the terminology therein employed will permit, having in view that the invention comprehends every use of which it is susceptible.

The same reference numerals employed throughout the accompanying drawings are employed to designate identical or similar parts.

Figure 2:
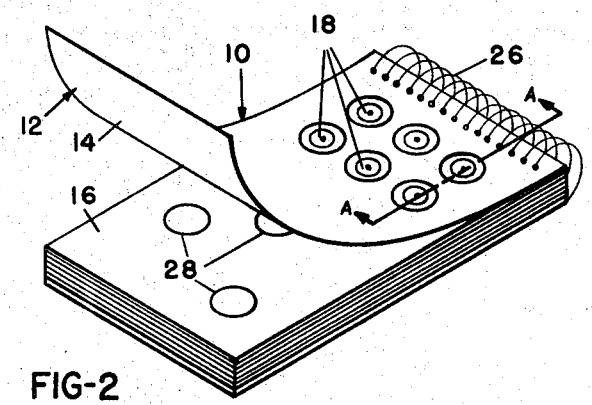
FIG. 2 is a perspective view of a tablet comprising the subject matter of this application.

Referring now more particularly to the drawing, I have shown a tablet indicated in its entirety by the reference numeral 10 which comprises a plurality of answer-sheets 12 or 12a, having a series of bull's eyes 18, in the same relative positions as the answers 20, printed on the upper face of the workbook page 22 together with the test or drill questions indicated at 24. Obviously, the indicia 20 and 24 will vary in accordance with the subjects matter of the test. The workbook 22 provides 3 answers to each question giving the student a multiple choice but again, it is obvious that there can be a greater or lesser number of answers 20 as found desirable. The answers 20 may also be imprinted upon the upper face of the answer-sheet 12 or 12a but where the selected indicia, for example, bull's eyes 18, is provided on the answer-sheet at the same relative positions as they are found on the page of the workbook, the answers 20 are not absolutely necessary to be thereon.

In the species of answer-sheets shown in FIG. 2 of the drawing, I provide a thin, sheet-like body of opaque pressure-dispersible, non-conductive material 14, which overlies an electrically conductive sheet or conductor 16 held in position with respect to each other by the spiral wire binding 26 which may be of a conductive metal and therefore form a contact to which an electrical connection may be secured. In this configuration, the spiral binding 26 is electrically connected to the conductor 16 while it physically restrains the sheets 14 and 16 against displacement from their positions relative to each other.

The bull's eyes 18 indicate the point at which the student should mark the page 14 to select the answer which is in the same relative position on the sheet of the workbook 22. For example, if the answer the student elects to mark is located in column 2 on the workbook for the question numbered 1, he would manipulate the stylus 30 or 30a to perforate the sheet 14 at that point, so that the conductive point 32 or 32a would contact the conductor 16, thus providing electrical connection between the stylus 30 or 30a and the conductor 16. The stylus is constructed and arranged to be associated in an electrical circuit similar to that disclosed in my copending application titled Electrokinetic Tutoring Means Ser. No. 607,802, filed Jan. 6, 1967, and may be of a sophisticated type than shown in the present drawing, for example, as that shown in my co-pending application titled Method and Means for Self Teaching Ser. No. 618,484, filed Feb. 24, 1967.

The sheet 16 may be perforated as at 28 either behind the incorrect answer locations or the correct answer locations and in either event, is superposed and in alignment with respect to its corresponding bull's eye 18.

Figure 3:
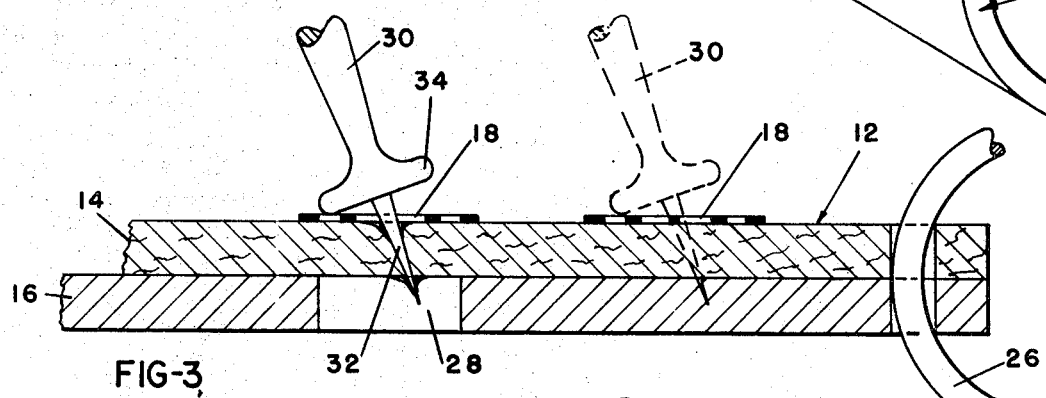
FIG. 3 is an enlarged vertical section as at section line a—a of FIG. 2.
Figure 4:
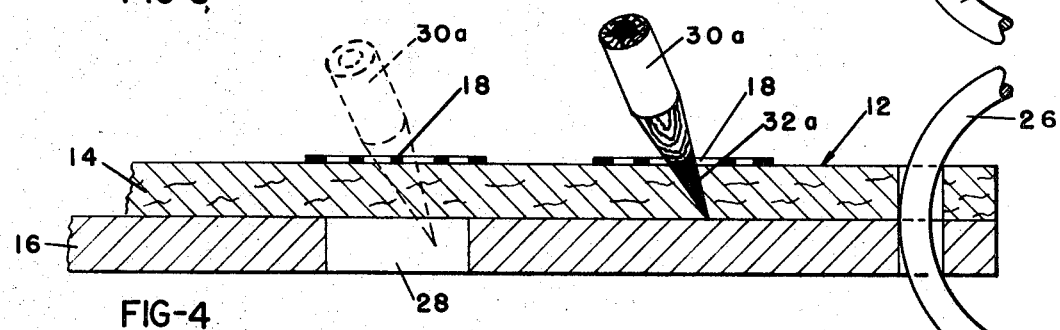
FIG. 4 is a view similar to FIG. 3 but showing a modified stylus.

As the stylus thus emerges from the underside of the pressure-dispersible nonconductive material of the opaque sheet 14, it either makes contact with the conductor 16 as shown in the right-hand portions of FIGS. 3 and 4 or fails to make contact as shown in the left-hand portions of FIGS. 3 and 4 and thus the electrical systems (not shown) can indicate to the student the accuracy of his selected answer. The stylus may have a flange as seen at 34 which will limit the distance the point 32 may penetrate through the sheet 14 and thus prevent its passing on into a subsequent sheet 14.

The sheet 14 may be of any material suitable for the stated function and adapated to the particular stylus. Where the stylus has a needle-like point, obviously. conventional papers may be used, but where the stylus is extremely blunt, a softer malleable body is required. This body may be formed by using hair-like strands, as for example, cotton fibres mixed with a rubber-like or gelatinous plastic, or similar products, to form a sheet which is opaque and upon which the indicia 18 may be printed.

The successive pages 12 of the answer-sheets lie one upon another and are thereby supported against the manually manipulated forces required to cause the stylus 30 to displace the sheet 14 and permit electrical contact with the conductor 16.

Figure 5:
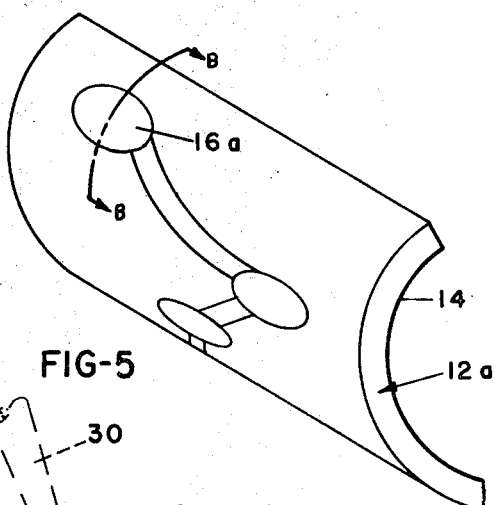
FIG. 5 is a fragmentary perspective view of a modified answer-sheet.
Figures 1, 6:
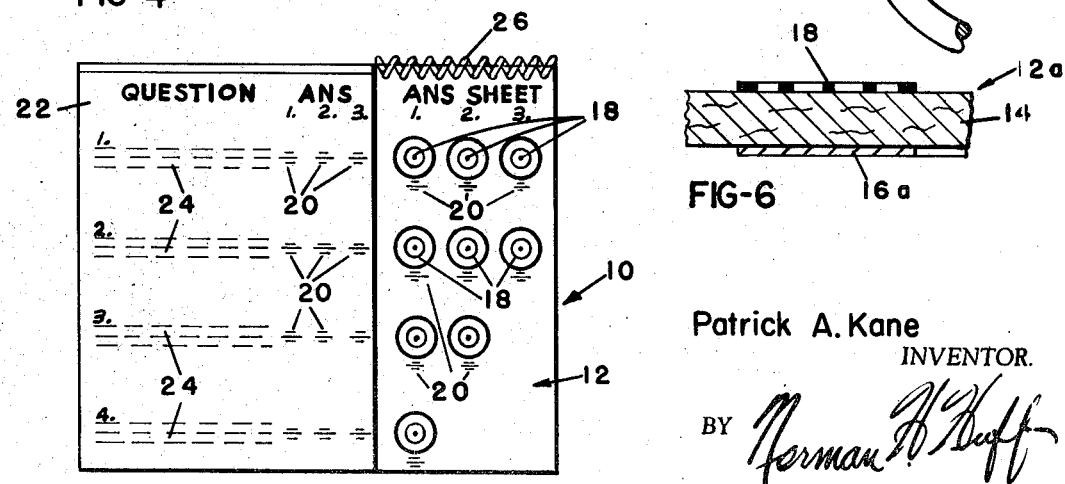
FIG. 1 is a plan view of a conventional workbook with an answer-sheet tablet contiguously disposed.
FIG. 6 is a lateral section taken substantially on the line indicated at b—b of FIG. 5.

In the modified form shown in FIGS. 5 and 6, I have substituted for the conductor 16, a printed circuit 16a which is adhesively secured to the underside of the sheet 14 and also in superimposition with respect to its bull's eye 18 in categories of either correct or incorrect answers. The printed circuit 16a, if desired, may also contact the spiral binding 26 to form a means of electrical connection to an educational system circuit.

It should also be noted that the conductor 16, may be adhesively secured to the sheet 14, thus not wholly relying upon the convolutions of the binding 26 to align the sheets 14 and 16 relative to each other. But, where the perforations are sufficiently small, as to insure electrical contact, the binding 26 also affords ample physical restraint against the relative displacement of the sheets 14 and 16.

After use, the sheets 14 and 16 or 14 with 16a are discarded as a unit.

Having thus described my invention, I desire to secure by Letters Patent of the United States the following:

1. For use with an electrically implemented educational device including a conductive stylus, a single-use, throw-away page, comprising:
   a thin, sheet-like body of opaque pressure-dispersible non-conductive material adapted to be penetrated by manual manipulation of said stylus;
   an electrical conductor in contact with and covering at least a portion of the underside of said body; and
   a spiral conductive wire binding having its convolutions passing through openings in said body and conductor, electrically contacting said conductor and restraining said body and conductor against relative displacement.

2. The invention according to claim 1 and further characterized by said displacement restraint, comprising:
   said conductor being adhesively attached to the underside of said body.

3. The invention according to claim 2 and further characterized by:
   visually discernible indicia on the upper face of said body; and
   at least some of said indicia being superposed with respect to at least some of said conductor.

4. The invention according to claim 1 and further characterized by means for supporting said conductor against bending under said stylus.

References Cited

UNITED STATES PATENTS

| 2,213,225 | 9/1940 | Maggioni | 35—48.1 |
|---|---|---|---|
| 2,503,130 | 4/1950 | Poritz | 35—48.1 |
| 3,057,082 | 10/1962 | Wellington et al. | 35—48 |
| 3,141,244 | 7/1964 | Smith | 35—9 |

JEROME SCHNALL, Primary Examiner

J. H. WOLFF, Assistant Examiner